US010749408B2

(12) United States Patent
Haun et al.

(10) Patent No.: US 10,749,408 B2
(45) Date of Patent: Aug. 18, 2020

(54) CONNECTING ELEMENT FOR CONNECTING A MOTOR SHAFT OF A MOTOR TO A ROTARY ENCODER AND MOTOR

(71) Applicant: Siemens Aktiengesellschaft, München (DE)

(72) Inventors: Dominik Haun, Bad Kissingen (DE); Helmut Schneider, Bad Kissingen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/332,704

(22) PCT Filed: Aug. 17, 2017

(86) PCT No.: PCT/EP2017/070828
§ 371 (c)(1),
(2) Date: Mar. 12, 2019

(87) PCT Pub. No.: WO2018/059825
PCT Pub. Date: Apr. 5, 2018

(65) Prior Publication Data
US 2019/0363608 A1     Nov. 28, 2019

(30) Foreign Application Priority Data

Sep. 29, 2016   (EP) ..................................... 16191465

(51) Int. Cl.
*H02K 7/00*     (2006.01)
*F16D 1/06*     (2006.01)
(Continued)

(52) U.S. Cl.
CPC ............. *H02K 7/003* (2013.01); *F04D 29/34* (2013.01); *F04D 29/38* (2013.01); *F16D 1/06* (2013.01); *F16D 1/10* (2013.01); *H02K 11/21* (2016.01)

(58) Field of Classification Search
CPC .......... H02K 7/003; H02K 11/21; H02K 9/06; F04D 29/34; F04D 29/38; G01D 11/245;
(Continued)

(56) References Cited

U.S. PATENT DOCUMENTS

2003/0113209 A1   6/2003  Wasson et al.
2013/0233669 A1*  9/2013  Zhao .................. F16D 1/10
                                                         192/69.8

FOREIGN PATENT DOCUMENTS

DE   102012206895 A1   1/2013
EP        1511157 A2   3/2005
JP       H08163828 A   6/1996

OTHER PUBLICATIONS

PCT Internation Search report and Written Opinion of International Searching Authority dated Oct. 25, 2017 corresponding to PCT International Application No. PCT/EP2017/070828 filed Aug. 17, 2017.

* cited by examiner

*Primary Examiner* — David H Bollinger
(74) *Attorney, Agent, or Firm* — Henry M. Feiereisen LLC

(57) ABSTRACT

A connecting element for connecting a motor shaft of a motor to an encoder shaft of a rotary encoder which is designed to detect a rotational position and/or a rotational speed of the motor shaft has a connecting region which runs in an annular shape around a connecting axis and has two end sides which lie axially opposite one another, an outer side facing away from the connecting axis and an inner side
(Continued)

facing the connecting axis. In addition, the connecting element has at least one fan blade which protrudes radially from the outer side of the connecting region.

20 Claims, 4 Drawing Sheets

(51) Int. Cl.
*F16D 1/10* (2006.01)
*H02K 11/21* (2016.01)
*F04D 29/34* (2006.01)
*F04D 29/38* (2006.01)

(58) Field of Classification Search
CPC ... G01D 11/30; F16D 1/06; F16D 1/10; F16B 7/00; F16B 7/10
USPC .......................................... 403/380, 375, 360
See application file for complete search history.

CONNECTING ELEMENT FOR CONNECTING A MOTOR SHAFT OF A MOTOR TO A ROTARY ENCODER AND MOTOR

CROSS-REFERENCES TO RELATED APPLICATIONS

This application is the U.S. National Stage of International Application No. PCT/EP2017/070828, filed Aug. 17, 2017, which designated the United States and has been published as International Publication No. WO 2018/059825 and which claims the priority of European Patent Application, Serial No. 16191465.0, filed Sep. 29, 2016, pursuant to 35 U.S.C. 119(a)-(d).

BACKGROUND OF THE INVENTION

The invention relates to the connection of a motor shaft of a motor to a rotary encoder which is embodied to detect a rotational position and/or a rotational speed of the motor shaft.

Motors often comprise a rotary encoder for the purpose of detecting a rotational position and/or a rotational speed of a motor shaft of the motor. A rotary encoder of a motor is frequently exposed to high temperatures produced as a result of the operation of the motor and capable of causing a failure of the rotary encoder due to excessive temperature.

JP H08 163826 A discloses a rotating electric machine with a rotation detector. Fins of a fan are coupled to a rotary shaft of the machine for the purpose of guiding air around the rotation detector in order to cool the latter.

The object underlying the invention is to disclose an improved connection of a motor shaft of a motor to a rotary encoder which is embodied to detect a rotational position and/or a rotational speed of the motor shaft.

SUMMARY OF THE INVENTION

According to one aspect of the invention, the object is achieved by a connecting element for connecting a motor shaft of a motor to an encoder shaft of a rotary encoder which is embodied to detect a rotational position and/or a rotational speed of the motor shaft. The connecting element has a connecting region which runs in an annular shape around a connecting axis and has two end sides which lie axially opposite one another, an outer side facing away from the connecting axis and an inner side facing toward the connecting axis. At least one fan blade protrudes radially from the outer side of the connecting region, Each end side of the connecting region has at least one coupling recess which extends radially from the inner side to the outer side of the connecting region.

Advantageous embodiments of the invention are the subject matter of the dependent claims.

The connecting element advantageously enables a motor shaft of a motor to be connected to the encoder shaft of a rotary encoder and a simultaneous cooling of the rotary encoder. The cooling is effected by means of at least one fan blade which is arranged externally on the connecting element. During a rotation of the motor shaft, the connecting element, and consequently also the at least one fan blade, is set into rotation, such that the fan blade generates an air flow in the region of the rotary encoder which cools the rotary encoder. This advantageously results in the rotary encoder being cooled precisely when said cooling of the rotary encoder is required, that is to say when the motor is in operation so that the motor shaft rotates. In particular, therefore, no additional power connection is required for the cooling by means of the at least one fan blade.

The coupling recesses in the end sides of the connecting region advantageously enable positive-locking connections of the connecting element to the motor shaft and the encoder shaft to be realized by means of motor shaft and encoder shaft studs protruding from the motor shaft and the encoder shaft respectively and projecting radially into the coupling recesses. In particular, positive-locking connections of the connecting element to the motor shaft and the encoder shaft of said type permit axial displacements of the motor shaft and the encoder shaft relative to the connecting element, with the result that temperature-induced changes in length of the motor shaft and the encoder shaft can be compensated for by the connecting element.

One embodiment of the invention provides a plurality of fan blades protruding radially from the outer side of the connecting region and distributed at regular intervals along a circle around the connecting axis. The cooling function of the connecting element is advantageously magnified by means of a plurality of fan blades as compared to just one fan blade. A uniform distribution of the fan blades around the circumference of the connecting element advantageously prevents unbalances that would be caused by an uneven distribution of the fan blades.

A further embodiment of the invention provides that each fan blade has substantially the shape of a prism with a triangular base area which stands out vertically from the outer side of the connecting region. This advantageously enables the fan blades to be produced in a simple manufacturing process and with a stable design.

A further embodiment of the invention provides that each end side of the connecting region has precisely two coupling recesses that are disposed radially opposite one another. In this arrangement, the two coupling recesses of a first end side are offset by, for example, 90 degrees relative to the coupling recesses of the second end side. This advantageously increases the stability of the positive-locking connections of the connecting element to the motor shaft and the encoder shaft. Furthermore, a symmetric loading of the connecting element by the motor shaft and the encoder shaft is achieved.

A further embodiment of the invention provides that each coupling recess has an axial depth which is roughly half as great as the axial extension of the connecting region. This produces a twofold advantage: firstly, it prevents the stability of the connecting element from being significantly reduced due to an excessively large axial depth of the coupling recesses; secondly, a sufficient depth of the coupling recesses is realized to enable reliable positive-locking connections of the connecting element to the motor shaft and the encoder shaft.

A further embodiment of the invention provides that the connecting region has at least one axially extending, groove-like indentation in each wall bounding a coupling recess and starting from an end side of the connecting region. Groove-like indentations of said type in walls of the coupling recesses advantageously facilitate axial displacements of the motor shaft end and the encoder shaft end relative to the connecting element in order to compensate for temperature-induced changes in length by reducing the friction between the connecting element and the motor shaft and the encoder shaft. The reduction in friction is achieved on the one hand by a reduction in the size of the friction surfaces between the connecting element and the motor shaft and between the connecting element and the encoder shaft. Furthermore, the indentations can accommodate a lubricant that is used for lubricating the coupling recesses, thereby further reducing the friction between the connecting element and the motor shaft and the encoder shaft.

A further embodiment of the invention provides that the connecting region has at least one cutout which extends axially from an end side and spaced apart from the outer side and the inner side. This advantageously enables the mass of the connecting element to be reduced and the stability of the connecting element to be increased.

A further embodiment of the invention provides that the connecting element is formed as a single, integral unit. This advantageously enables the stability of the connecting element to be increased and the manufacturing costs of the connecting element to be reduced.

A further embodiment of the invention provides that the connecting element is fabricated from a plastic material. This advantageously enables the mass and the manufacturing costs of the connecting element to be reduced for example compared to a fabrication of the connecting element from metal.

A motor according to the invention comprises a motor shaft having a motor shaft longitudinal axis, a rotary encoder for detecting a rotational position and/or a rotational speed of the motor shaft, and a connecting element according to the invention. The rotary encoder comprises an encoder shaft having an encoder shaft longitudinal axis. The connecting element connects a motor shaft end of the motor shaft on the encoder shaft side and an encoder shaft end of the encoder shaft on the motor shaft side to one another in that it is connected in a positive-locking manner in each case to the motor shaft end and to the encoder shaft end, wherein a first end side of the connecting region of the connecting element faces toward the motor shaft, the second end side of the connecting region of the connecting element faces toward the rotary encoder, and the connecting axis of the connecting element coincides with the motor shaft longitudinal axis and the encoder shaft longitudinal axis.

One embodiment of the motor provides that each end side of the connecting region has at least one coupling recess which extends radially from the inner side to the outer side of the connecting region, the motor shaft end has, for each coupling recess of the first end side, a motor shaft stud projecting radially into the coupling recess, and the encoder shaft end has, for each coupling recess of the second end side, an encoder shaft stud projecting radially into the coupling recess.

The advantages of a motor according to the invention will become apparent from the advantages of a connecting element according to the invention that have already been cited hereinabove.

BRIEF DESCRIPTION OF THE DRAWING

The above-described characteristics, features and advantages of the present invention, as well as the manner in which these are achieved, will become clearer and more readily understandable in connection with the following description of exemplary embodiments which are explained in more detail with reference to the drawings, in which.

DETAILED DESCRIPTION OF PREFERRED EMBODIMENTS

Figure 1:
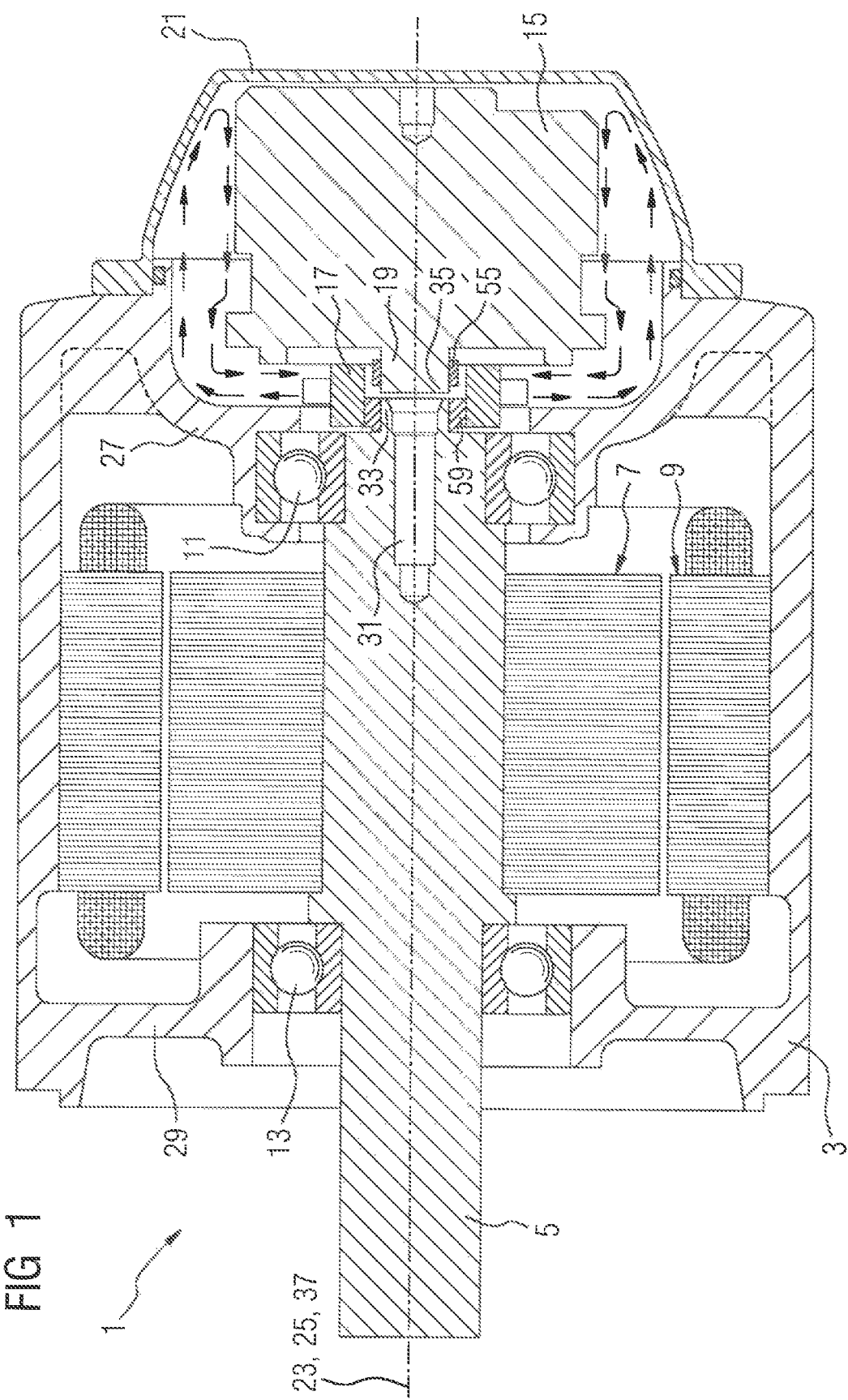
FIG. 1 shows a sectional view of a motor having a rotary encoder.

Parts corresponding to one another are labeled with the same reference numerals in all the figures.

FIG. 1 shows a schematic sectional view of a motor 1, which is an electric motor. The motor 1 comprises a motor housing 3, a motor shaft 5, a rotor 7 arranged on the motor shaft 5, a stator 9 arranged around the rotor 7 on the motor housing 3, two motor shaft bearings 11, 13 for mounting the motor shaft 5, a rotary encoder 15 for detecting a rotational position and/or a rotational speed of the motor shaft 5, a connecting element 17 for connecting the motor shaft 5 to an encoder shaft 19 of the rotary encoder 15, and an encoder cover 21.

Figure 2:
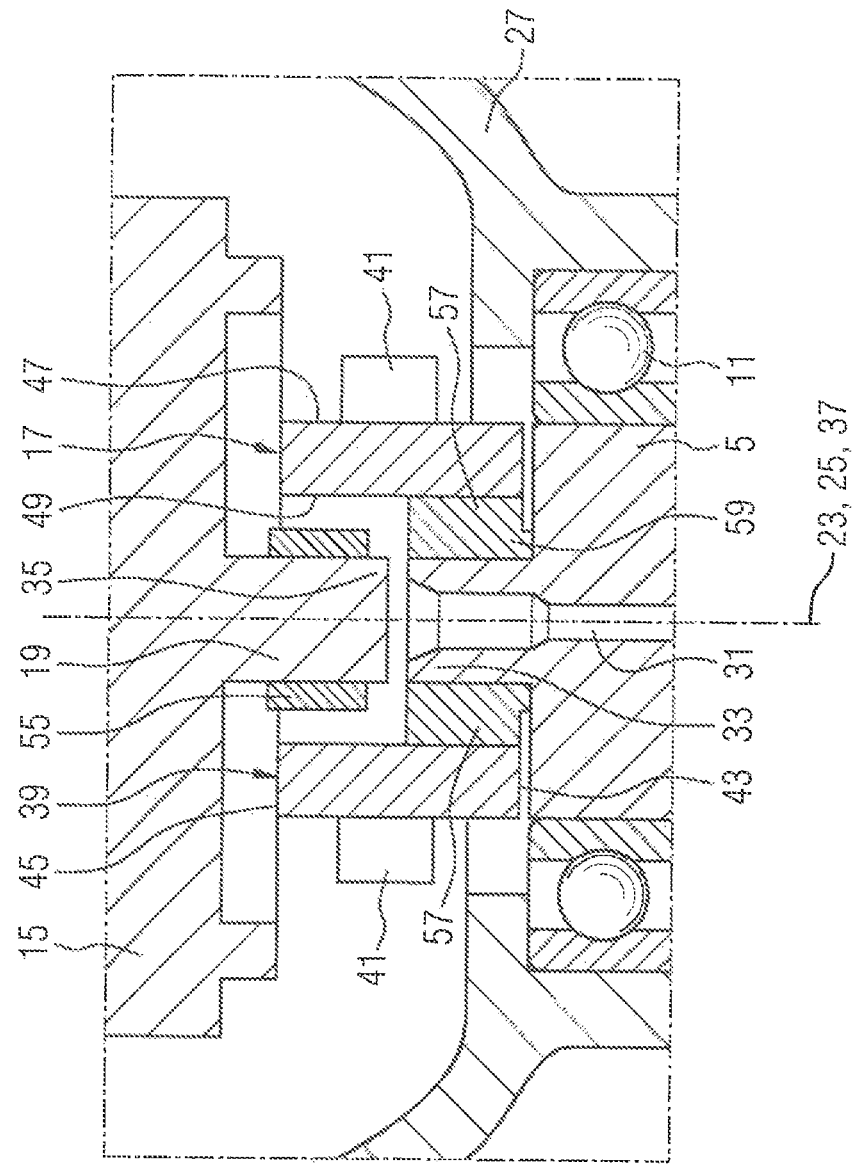
FIG. 2 shows an enlarged detail of FIG. 1.

FIG. 2 shows an enlarged detail of FIG. 1 in the region of the connecting element 17.

Figure 3:
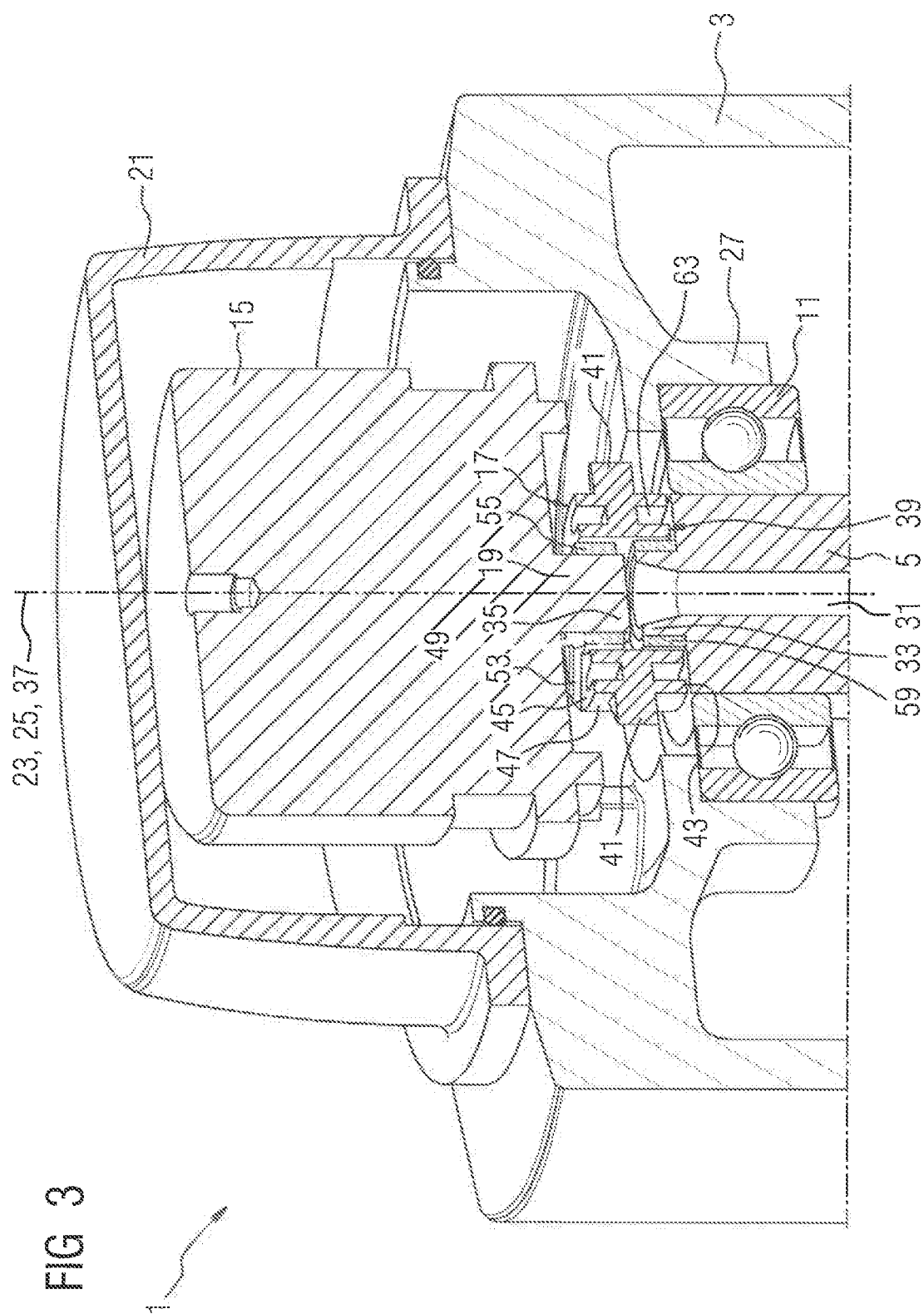
FIG. 3 shows a perspective sectional view of the motor shown in FIG. 1 in the region of the rotary encoder.

FIG. 3 shows a perspective sectional view of the motor 1 illustrated in FIG. 1 in the region of the rotary encoder 15.

Figure 4:
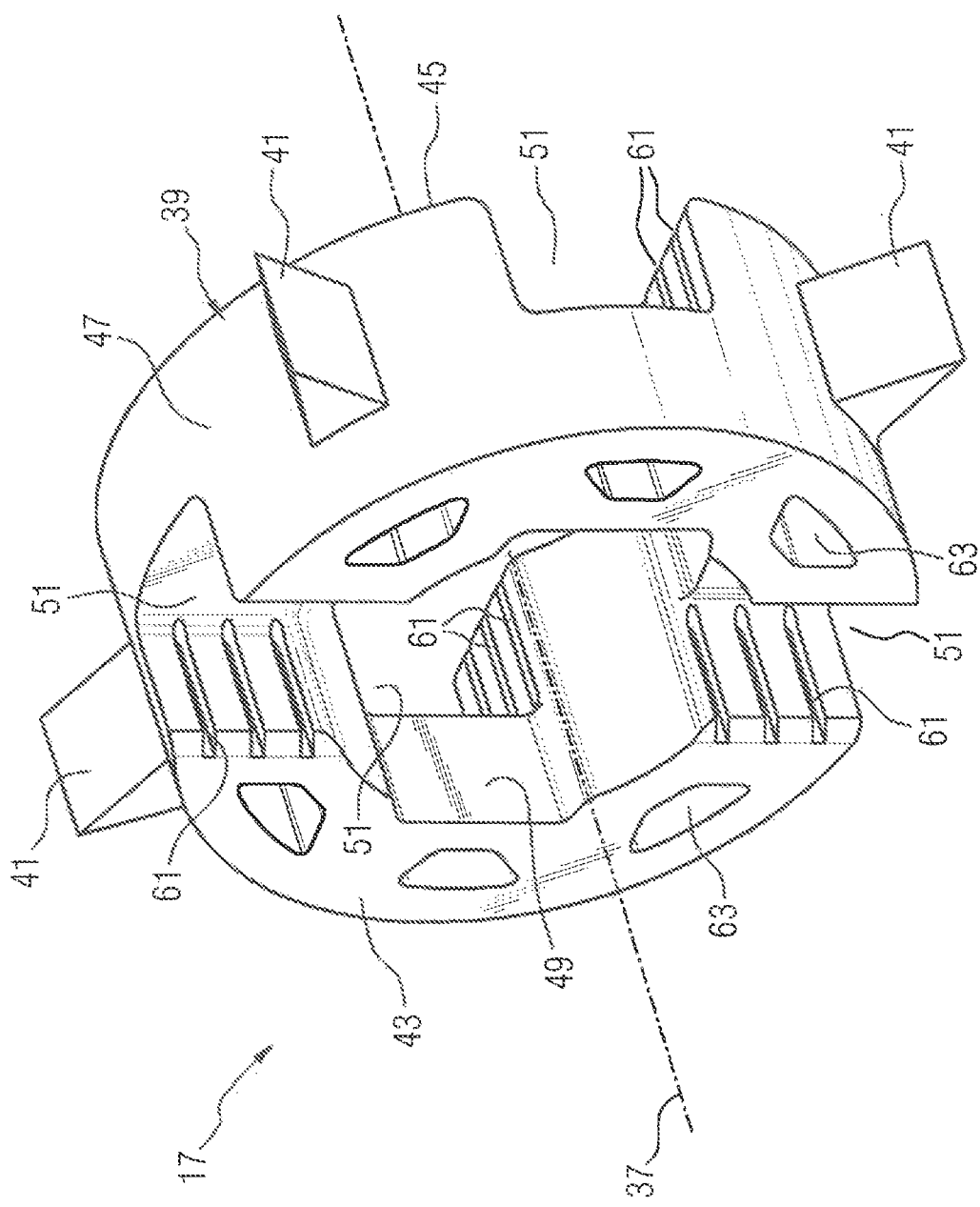
FIG. 4 shows a perspective view of a connecting element for connecting a motor shaft of a motor to an encoder shaft of a rotary encoder.

FIG. 4 shows a perspective view of the connecting element 17.

The motor shaft 5 is mounted by means of the motor shaft bearings 11, 13 so as to be rotatable about a motor shaft longitudinal axis 23 of the motor shaft 5. A first motor shaft bearing 11 is arranged on a first bearing shield 27 of the motor housing 3 facing toward the rotary encoder 15. The second motor shaft bearing 13 is arranged on a second bearing shield 29 of the motor housing 3 facing away from the rotary encoder 15. On the rotary encoder side, the motor shaft 5 has a bore 31 extending along the motor shaft longitudinal axis 23.

The rotary encoder 15 is mounted so as to be rotatable about an encoder shaft longitudinal axis 25 which coincides with the motor shaft longitudinal axis 23.

The encoder cover 21 is embodied in a pot-like shape and seals off an end of the motor housing 3 on the rotary encoder side. The encoder cover 21 protects the rotary encoder 15 against influences from the environment of the motor 1.

The connecting element 17 connects a motor shaft end 33 of the motor shaft 5 on the encoder shaft side to an encoder shaft end 35 of the encoder shaft 19 on the motor shaft side, such that the encoder shaft 19 co-rotates with the motor shaft 5. The motor shaft end 33 and the encoder shaft end 35 have at least approximately equal outer diameters and are spaced apart from one another.

The connecting element 17 comprises a connecting region 39 which runs in an annular shape around a connecting axis 37, as well as a plurality of fan blades 41. The connecting axis 37 coincides with the motor shaft longitudinal axis 23 and the encoder shaft longitudinal axis 25. The connecting region 39 has two end sides 43, 45 which lie axially opposite one another, an outer side 47 facing away from the connecting axis 37, and an inner side 49 facing toward the connecting axis 37. A first end side 43 of the connecting region 39 faces toward the motor shaft 5, while the second end side 45 faces toward the rotary encoder 15. The fan blades 41 protrude radially from the outer side 47 of the connecting region 39. The terms radially and axially refer in this context to the connecting axis 37.

The fan blades 41 are distributed at regular intervals along a circle around the connecting axis 47 on the outer side 47 of the connecting region 39. In the exemplary embodiment illustrated in FIG. 4, the connecting element 17 has four fan blades 41. However, alternative exemplary embodiments of the connecting element 17 may also have a different number of fan blades 41. Each fan blade 41 has substantially the shape of a prism with a triangular base area which stands out vertically from the outer side 47 of the connecting region 39. During a rotation of the motor shaft 5, the fan blades 41 generate an air flow, indicated by arrows in FIG. 1, which distributes colder air from the region of the encoder cover 21 around the rotary encoder 15 and thereby advantageously cools the rotary encoder 15.

Each end side 43, 45 of the connecting region 39 of the connecting element 17 has two coupling recesses 51 which extend radially in each case from the inner side 49 to the outer side 47 of the connecting region 39 and are disposed radially opposite one another. The coupling recesses 51 of the first end side 43 are offset by 90 degrees relative to the coupling recesses 51 of the second end side 45. Each coupling recess 51 has an axial depth which is roughly half as great as the axial extension of the connecting region 39.

For each coupling recess 51 of the second end side 45 of the connecting region 39, the encoder shaft end 35 has an encoder shaft stud 53 projecting radially into the coupling recess 51. Each encoder shaft stud 53 is part of an encoder shaft attachment 55 which annularly surrounds the encoder shaft end 35 and is press-fitted onto the encoder shaft end 35. The engagement of the encoder shaft studs 53 into the coupling recesses 51 of the second end side 45 of the connecting region 39 causes the encoder shaft end 35 to be connected to the connecting element 17 in a positive-locking manner.

Analogously thereto, for each coupling recess 51 of the first end side 43 of the connecting region 39, the motor shaft end 33 has a motor shaft stud 57 projecting radially into the coupling recess 51. Each motor shaft stud 57 is part of a motor shaft attachment 59 which annularly surrounds the motor shaft end 33 and is press-fitted onto the motor shaft end 33. The engagement of the motor shaft studs 57 into the coupling recesses 51 of the first end side 43 of the connecting region 39 causes the motor shaft end 33 to be connected to the connecting element 17 in a positive-locking manner.

The positive-locking connections of the motor shaft end 33 and the encoder shaft end 35 to the connecting element 17 enable axial displacements of the motor shaft end 33 and the encoder shaft end 35 relative to the connecting element 17, such that temperature-induced changes in length of the motor shaft 5 and the encoder shaft 19 can be compensated for by the connecting element 17.

In order to facilitate such axial displacements of the motor shaft end 33 and the encoder shaft end 35 relative to the connecting element 17, the connecting element 17 has axially extending groove-like indentations 61 in each wall bounding a coupling recess 51 and starting from an end side 43, 45 of the connecting region 39. The friction between the connecting element 17 and the motor shaft end 33 and the encoder shaft end 35 is advantageously reduced by the indentations 61 as a result of a reduction in the size of the friction surfaces between the connecting element 17 and the motor shaft end 33 and the encoder shaft end 35. Furthermore, the indentations 61 can accommodate a lubricant which is used for lubricating the coupling recesses 51, thereby further reducing the friction between the connecting element 17 and the motor shaft end 33 and the encoder shaft end 35.

Optionally, the connecting region 39 has a plurality of cutouts 63 which extend axially in each case from an end side 43, 45 and spaced apart from the outer side 47 and from the inner side 49. This advantageously enables the mass of the connecting element 17 to be reduced.

The connecting element 17 is preferably fabricated from a plastic material and formed as a single, integral unit, and produced in an injection molding process, for example.

Although the invention has been illustrated and described in more detail on the basis of preferred exemplary embodiments, the invention is not limited by the disclosed examples and other variations may be derived herefrom by the person skilled in the art without leaving the scope of protection of the invention.

The invention claimed is:

1. A connecting element for connecting a motor shaft of a motor to an encoder shaft of a rotary encoder which detects a rotational position and/or a rotational speed of the motor shaft, said connecting element comprising:
 a connecting region configured to run in an annular shape around a connecting axis, said connecting region including two end sides which lie axially opposite one another, an outer side facing away from the connecting axis, and an inner side facing toward the connecting axis, each said end side of the connecting region having a coupling recess which extends radially from the inner side to the outer side of the connecting region; and
 a fan blade protruding radially from the outer side of the connecting region.

2. The connecting element of claim 1, further comprising a plurality of said fan blade protruding radially from the outer side of the connecting region and distributed at regular intervals along a circle around the connecting axis.

3. The connecting element of claim 1, wherein the fan blade has substantially a shape of a prism with a triangular base area which extends out vertically from the outer side of the connecting region.

4. The connecting element of claim 1, wherein each said end side of the connecting region has precisely two of said coupling recess disposed radially opposite one another.

5. The connecting element of claim 4, wherein the two coupling recesses of one of the end sides are offset by 90 degrees relative to the two coupling recesses of another one of the end sides.

6. The connecting element of claim 1, wherein the coupling recess has an axial depth which is roughly half as great as an axial extension of the connecting region.

7. The connecting element of claim 1, wherein the connecting region includes an axially extending groove-like indentation in each wall bounding the coupling recess, said indentation extending from one of the end sides of the connecting region.

8. The connecting element of claim 1, wherein the connecting region has a cutout which extends axially from one of the end sides at a distance to the outer side and to the inner side.

9. The connecting element of claim 1, wherein the connecting element is formed as a single, integral unit.

10. The connecting element of claim 1, wherein the connecting element is fabricated from a plastic material.

11. A motor, comprising:
 a motor shaft defining a motor shaft longitudinal axis;
 a rotary encoder detecting a rotational position and/or a rotational speed of the motor shaft, said rotary encoder including an encoder shaft defining an encoder shaft longitudinal axis; and
 a connecting element connected in a positive-locking manner to a motor shaft end of the motor shaft on an encoder shaft side and connected in a positive-locking manner to an encoder shaft end of the encoder shaft on a motor shaft side for connecting the motor shaft end and the encoder shaft end to one another, said connecting element including a connecting region configured to run in an annular shape around a connecting axis, said connecting region including two end sides which lie axially opposite one another, an outer side facing away from the connecting axis, and an inner side facing toward the connecting axis, each said end side of the connecting region having a coupling recess which extends radially from the inner side to the outer side of the connecting region, and a fan blade protruding radially from the outer side of the connecting region, wherein a first one of the end sides of the connecting region of the connecting element faces toward the motor shaft and a second one of the end sides of the connecting region of the connecting element faces toward the rotary encoder, and wherein the connecting axis of the connecting element coincides with the motor shaft longitudinal axis and the encoder shaft longitudinal axis.

12. The motor of claim 11, wherein the motor shaft end includes for the coupling recess of the Mt end side a motor shaft stud which projects radially into the coupling recess of the first end side, and for the coupling recess of the second end side an encoder shaft stud which projects radially into the coupling recess of the second end side.

13. The motor of claim 11, wherein the connecting element includes a plurality of said fan blade protruding radially from the outer side of the connecting region and distributed at regular intervals along a circle around the connecting axis.

14. The motor of claim 11, wherein the fan bade has substantially a shape of a prism with a triangular base area which extends out vertically from the outer side of the connecting region.

15. The motor of claim 11, wherein each of the first and second end skies of the connecting region has precisely two of said coupling recess disposed radially opposite one another.

16. The motor of claim 15, wherein the two coupling recesses of the first end side are offset by 90 degrees relative to the two coupling recesses of the second end side.

17. The motor of claim 11, wherein the coupling recess of each said end side of the connecting region has an axial depth which is roughly half as great as an axial extension of the connecting region.

18. The motor of claim 11, wherein the connecting region includes an axially extending groove-like indentation in each wall bounding the coupling recess, said indentation extending from one of the end sides of the connecting region.

19. The motor of claim 11, wherein the connecting region has a cutout which extends axially from one of the end sides at a distance to the outer side and to the inner side.

20. The motor of claim 11, wherein the connecting element is formed as a single, integral unit made of plastic material.

* * * * *

UNITED STATES PATENT AND TRADEMARK OFFICE
CERTIFICATE OF CORRECTION

Page 1 of 1

PATENT NO.        : 10,749,408 B2
APPLICATION NO.   : 16/332704
DATED             : August 18, 2020
INVENTOR(S)       : Dominik Haun and Helmut Schneider It is certified that error appears in the above-identified patent and that said Letters Patent is hereby corrected as shown below:

On the Title Page

Item [56] FOREIGN PATENT DOCUMENTS:
Correct the publication date of "DE 10 2012 206 895 A1" to read --10/2013--.

In the Claims

In Column 7, Claim 12, Line 22:
Replace "Mt" with --first--.

In Column 8, Claim 15, Line 9:
Replace "skies" with --sides--.

Signed and Sealed this
Thirteenth Day of October, 2020

Andrei Iancu
*Director of the United States Patent and Trademark Office*